(12) United States Patent
Helmersson et al.

(10) Patent No.: US 8,208,456 B2
(45) Date of Patent: Jun. 26, 2012

(54) METHOD AND ARRANGEMENT IN A TELECOMMUNICATION SYSTEM

(75) Inventors: Ke Wang Helmersson, Linkoping (SE); Maria Samuelsson, Modena (IT); Erik Dahlman, Bromma (SE); Maria Edvardsson, Jarfalla (SE); Eva Englund, Linkoping (SE); Mats Fredrik Sagfors, Kyrkslatt (FI); Janne Peisa, Espoo (FI); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1055 days.

(21) Appl. No.: 11/575,116

(22) PCT Filed: Sep. 12, 2005

(86) PCT No.: PCT/SE2005/001328
§ 371 (c)(1),
(2), (4) Date: Mar. 12, 2007

(87) PCT Pub. No.: WO2006/031187
PCT Pub. Date: Mar. 23, 2006

(65) Prior Publication Data
US 2007/0286068 A1    Dec. 13, 2007

(30) Foreign Application Priority Data
Sep. 13, 2004    (SE) ...................................... 0402208

(51) Int. Cl.
*H04Q 7/28* (2006.01)
(52) U.S. Cl. ........ 370/341; 370/342; 370/348; 370/335; 370/253; 370/230; 455/522; 455/513; 455/515; 375/316; 375/295
(58) Field of Classification Search .................. 455/522, 455/513, 515, 509; 370/341, 342, 348, 335, 370/236, 216, 229, 232, 252, 253, 230, 235; 375/316, 295
See application file for complete search history.

(56) References Cited

U.S. PATENT DOCUMENTS
7,164,654 B2 * 1/2007 Hunzinger et al. ........... 370/230
(Continued)

FOREIGN PATENT DOCUMENTS
EP    1 501 233 A2    1/2005
(Continued)

OTHER PUBLICATIONS

Ke Wang Helmersson; "System Performance of WCDMA Enhanced Uplink" Vehicular Technology Conference; 2005; VTC 2005-Spring. 2005 IEEE 61$^{st}$; Publication date May 1-30, 2005 vol. 3, ISSN:1550-2252.
Ghosh A; Vehicular Technology Conference, 2004 VTC 2004-Spring. 2004 IEEE 59$^{th}$ Milan Italy May 17-19, 2004 Piscataway NJ USA IEEE,US ISBN 0-7803-8255-2.
E-DCH Outer Loop Power Control. 3GPP TSG-RAN WG2 meeting #43 Tdoc R2-041618. Aug. 16, 2004.

(Continued)

*Primary Examiner* — Patrick Edouard
*Assistant Examiner* — Fred Casca

(57) ABSTRACT

A method and an arrangement for obtaining efficient radio resource utilization in a communication network comprising a first communication network entity (10), a second communication network entity (15) connected to said first communication network over a communication interface and one or more user equipments (18) transmitting data to said second communication network entity (15) over a radio interface. The user equipments (18) perform the step of autonomously selecting a hybrid automatic retransmission request (HARQ) operating point in order to efficiently deliver transmitted data.

20 Claims, 1 Drawing Sheet

U.S. PATENT DOCUMENTS

| | | | |
|---|---|---|---|
| 2003/0009717 A1* | 1/2003 | Fukushima et al. | 714/748 |
| 2003/0039217 A1* | 2/2003 | Seo et al. | 370/318 |
| 2003/0076870 A1* | 4/2003 | Moon et al. | 375/130 |
| 2003/0123396 A1* | 7/2003 | Seo et al. | 370/252 |
| 2004/0116143 A1* | 6/2004 | Love et al. | 455/522 |
| 2005/0041589 A1* | 2/2005 | Kwon et al. | 370/236 |
| 2005/0124372 A1* | 6/2005 | Lundby et al. | 455/522 |
| 2006/0252445 A1* | 11/2006 | Kim et al. | 455/522 |

FOREIGN PATENT DOCUMENTS

| | | |
|---|---|---|
| WO | WO 2004091114 | 10/2004 |
| WO | WO 2004091114 A1 | 10/2004 |

OTHER PUBLICATIONS

Samsung. Node B Controlled Scheduling. 3GPP Draft; R1-040851; $3^{rd}$ Generation Partnership Project; Mobile Competence Centre, Sophia-Antipolis France; Aug. 12, 2004.

Samsung. HARQ Principle. 3GPP Draft; R1-040864; $3^{rd}$ Generation Partnership Project; Mobile Competence Centre, Sophia-Antipolis France; Aug. 12, 2004.

3GPP. $3^{rd}$ Generation Partnership Project; Technical Speciation Group Radio Access Network; Feasibility Study for Enhanced Uplink for UTRA FDD (Release6). 3GPP TR 25.896 v6.0.0 (Mar. 2004).

* cited by examiner

METHOD AND ARRANGEMENT IN A TELECOMMUNICATION SYSTEM

TECHNICAL FIELD

The present invention relates to methods and arrangements in a Wideband Code Division Multiple Access (WCDMA) communication system, in particular to an enhanced uplink for WCDMA.

BACKGROUND OF THE INVENTION

Enhanced uplink for WCDMA is currently being standardized within the Third Generation Partnership Project (3GPP). Among the features introduced is fast scheduling and fast hybrid Automatic Retransmission Request (ARQ) with soft combining, both located in the Node B.

Hybrid ARQ with soft combining allows the Node B to rapidly request retransmissions of erroneously received data entities, leading to significantly reduced delays compared to earlier releases of the WCDMA specification where the Radio Network Controller (RNC) is responsible for all retransmissions within the radio access network. Soft combining with hybrid ARQ can also be used to enhance the capacity of the system by deliberately target multiple transmission attempts for each data entity and use the soft combining mechanism in the receiver to accumulate the received energy until the data is successfully decoded. This can be viewed as implicit link adaptation and is not possible in earlier releases of the WCDMA specification due to lack of a soft combining mechanism in these releases. Typically, a small number of transmission attempts, i.e. a low Block Error Rate (BLER) for the initial transmission, reduce the transmission delays at the cost of a decreased system capacity. Similarly, by targeting a larger number of transmission attempts, i.e. a high BLER for the initial transmission attempt, the system capacity is increased at the cost of increased delays. The choice of hybrid ARQ operating points (in terms of the targeted number of transmission attempts) thus depends on the system load and the delay requirements for a particular service. The possibility for retransmission by the Radio Link Control (RLC) layer in the RNC remains with the introduction of hybrid ARQ in the Node B. This is useful in situations when the hybrid ARQ mechanism in the Node B cannot deliver error-free data entities to the RNC.

Fast scheduling denotes the possibility for the Node B to control when a user equipment is transmitting and at what data rate. Data rate and transmission power is closely related and scheduling can thus also be seen as a mechanism to vary the transmission power used by the user equipment for the enhanced uplink traffic on the E-DPDCH. As the power availability in the user equipment at the time of transmission is not known to the Node B, the final selection of data rate has to be performed by the user equipment itself. The Node B only sets an upper limit on the transmission power the UE may use on the E-DPDCH.

Similarly to the uplink in earlier releases of the WCDMA standard, the enhanced uplink uses inner and outer loop power control. The power control mechanism ensures that a user equipment does not transmit with higher power than required for successful delivery of the transmitted data. This ensures stable system operation and efficient radio resource utilization.

The power control mechanism consists of two parts: an inner loop, located in the Node B, and an outer loop, located in the RNC. The inner loop is fast and updates the user equipment transmission power 1500 times per second in order to combat fast fading. This is done by measuring the received Signal to Interference Ratio (SIR), comparing it with a SIR target, and sending a power control command to the user equipment. If the received SIR is below the SIR target, the user equipment is instructed to increase the transmission power and vice versa if the received SIR is above the target the user equipment is instructed to decrease. The inner loop power control operates on the DPCCH. The transmission power of the E-DPDCH is set relative to the DPCCH and depends on the instantaneous data rate on the E-DPDCH.

The outer loop sets the SIR target in the inner loop and uses statistics available to the RNC, e.g. information whether each data entity for a particular UE delivered to the RNC from the Node B is error-free or not. The outer loop is significantly slower than the inner loop and adapts to slow changes in the radio conditions to match the SIR target to the required quality of service in terms of, e.g., BLER or packet delay.

The introduction of a Hybrid ARQ protocol in the Node B requires modifications to the outer loop mechanism compared to previous releases as the hybrid ARQ protocol ideally hides all the error events from the RNC. Solutions to this problem are described in the patent application PCT/SE2004/000541, where different types of statistics on the Hybrid ARQ operation is proposed to be forwarded to the RNC. One possibility is to inform the RNC about the number of transmission attempts required until a packet is successfully received. If the number of attempts indicated to the outer loop mechanism is larger (smaller) than a target value, the SIR target is increased (decreased), resulting in the inner loop requesting a higher (lower) transmission power from the UE.

SUMMARY OF THE INVENTION

It is the object of the present invention to provide an improved method for obtaining efficient radio resource utilization in a communication network comprising a first communication network entity (10), a second communication network entity (15) connected to said first communication network over a communication interface and one or more user equipments (18) transmitting data to said second communication network entity (15) over a radio interface.

This object is achieved by the the independent claims.

Accordingly it is an object of the present invention to provide an improved arrangement for obtaining efficient radio resource utilization in a communication network comprising a first communication network entity (10), a second communication network entity (15) connected to said first communication network over a communication interface and one or more user equipments (18) transmitting data to said second communication network entity (15) over a radio interface.

This other object is achieved by the independent claims.

Due to the provision of a system where the user equipments autonomously select a hybrid automatic retransmission request operation point, an improved link efficiency is obtained where the user equipment selects operating point depending of the existing circumstances, such as power availability, granted upper limit of power offset and/or on which logical channel the user equipment has received data.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless

DETAILED DESCRIPTION OF PREFERRED EMBODIMENTS

Figure 1:
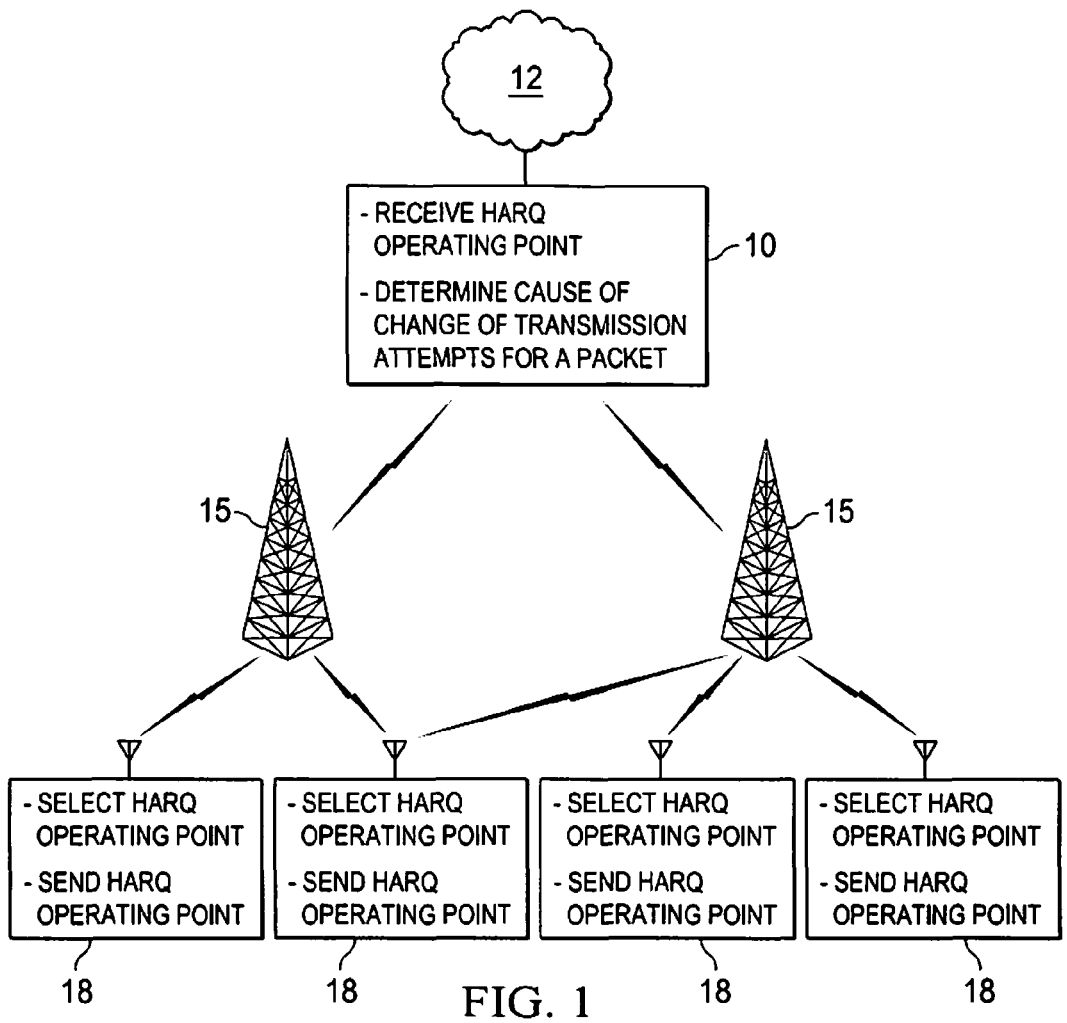
FIG. 1 shows the communication network architecture according to the present invention.

A network according to a standard like 3GPP comprises a Core Network (CN), Radio Access Networks (RAN) and User Equipments (UE) attached to a RAN, such as the UMTS Terrestrial Radio Access Network (UTRAN) architecture. FIG. 1 shows an exemplary network like this, wherein the UTRAN comprises one or more Radio Network Controllers (RNCs) 10 and one or more radio base stations 15, in the following denoted as Node B, which are connected to the RNC 10 through the Iub-interface. The UTRAN connects to the core network 12 through the Iu-interface. The UTRAN and the CN 12 provide communication and control for a plurality of user equipments 18.

Node B 15 is the function within the UTRAN that provides the physical radio link between the user equipments 18 and the network. Along with the transmission and reception of data across the radio interface the Node B 15 also applies the codes that are necessary to describe channels in a CDMA system. In Node B 15, there is provided a scheduler which controls when a user equipment is transmitting and at what data rate. There is also provided the Hybrid Automatic Retransmission Request (HARQ), which allows Node B 15 to rapidly request retransmissions of erroneously received data entities.

The RNC 10 comprises an Outer Loop Power Controller (OLPC) which sends a SIR target level to an inner loop power controller provided in Node B 15 as described above.

Figure 2:
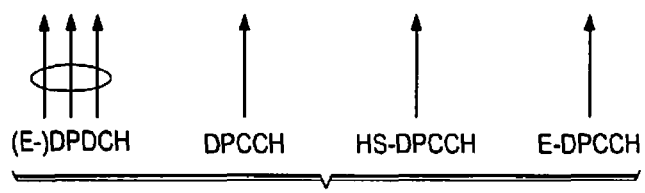
FIG. 2 illustrates the uplink channels after the introduction of the enhanced uplink according to the present invention.

In the uplink direction, several channels from each UE 18 will be transmitted with the introduction of the enhanced uplink as illustrated in FIG. 2. The Dedicated Physical Control Channel (DPCCH) carries pilot symbols and parts of the outband control signalling. Remaining outband control signalling for the enhanced uplink is carried on the Enhanced Dedicated Physical Control Channel (E-DPCCH) which is a new control channel, while the Enhanced Dedicated Physical Data Channel (E-DPDCH) carries the data transmitted using the enhanced uplink features. As the High Speed Dedicated Physical Control Channel (HS-DPCCH) is not related to the enhanced uplink it is not discussed further.

As stated above, the scheduler in the Node B cannot set exactly which power the user equipment may use on the E-DPDCH, but can only set an upper limit on the E-DPDCH/DPCCH power ratio. Consequently, the probability of successful decoding of the transmitted data will vary, depending on the power ratio used by the user equipment. The power ratio used is not known to the RNC, which thus cannot differentiate between variations in the number of transmission attempts due to channel variations and due to the user equipment varying the E-DPDCH/DPCCH power ratio.

There are several reasons why the user equipment may vary the E-DPDCH/DPCCH transmission power for a given size of a packet:

High priority delay sensitive data. In this case, the user equipment may want to use a higher E-DPDCH/DPCCH power ratio to target a smaller number of transmission attempts than typically used in the outer loop power control.

The scheduler may have granted the user equipment to use a higher upper limit on the power ratio (data rate) than can be used with respect to the amount of data in the user equipment buffer. One reason could be that the network is lightly loaded and the excess capacity can be used to lower the data transmission delays by trying to obtain a successful transmission with a smaller number of transmission attempts than typically used. Therefore, it is typically desirable if the user equipment uses as much of the granted power as possible.

At the time of retransmission, the amount of power available may be larger than for the initial transmission. Provided that the user equipment is allowed to exploit this additional power for the retransmission, the data transmission delays can be reduced.

It is proposed to solve the problem outlined above by informing the outer loop power control of a momentarily change in the power offset, or targeted number of transmissions. With this information, the outer loop can determine whether a change in the number of transmission attempts compared to the configured value for a particular packet depends on variations in the channel quality or on temporary changes in the E-DPDCH power decided upon by the user equipment. For example, if the power offset is larger than configured, the outer loop power control can treat the packet as if the targeted number is achieved, although a smaller number of transmissions are needed.

The user equipment is allowed to select autonomously between a number of power offset values for each transport block size (TB size) according to a transport format (TF) table. The table below shows an example of a transport format table containing two possible offsets per transport block size. In said table two levels are available, a "normal" mode and a "boost" mode. The offset Δ corresponds to a block error rate, BLER, after N transmission attempts while the offset Δ' corresponds to a block error rate BLER' after N' transmission attempts.

| TF | TB size | Power offset normal | $N_{tgt}$ normal | Power offset boost | $N_{tgt}$ boost |
|---|---|---|---|---|---|
| 1 | 320 | Δ | N | Δ' | N' |
| 2 | 2 × 320 | 2 × Δ | N | 2 × Δ' | N' |
| 3 | 3 × 320 | 3 × Δ | N | 3 × Δ' | N' |
| 4 | 4 × 320 | 4 × Δ | N | 4 × Δ' | N' |
| 5 | 5 × 320 | 5 × Δ | N | 5 × Δ' | N' |
| ... | ... | ... | ... | ... | ... |

The Node B can either estimate the power ratio for each transmission attempt or be informed by the UE about the ratio used through control signalling on the E-DPCCH. The number of offsets allowed for the UE can be limited in order to limit to signalling requirements or, in case the offset is estimated, simplify the estimation. The power ratio and/or the TF (or a similar quantity) that has been used by the UE is sent to the outer loop. The outer loop uses this information to adjust the SIR target according to the block error rate and number of transmission attempts corresponding to the offset.

Alternatively, if the same BLER is assumed for the different number of target attempts, the Node B can estimate the number of transmission attempts that the UE targeted, $T_{tgt}$, based on the power ratio used by the UE. The outer loop can use some relation between the actual number of transmission attempts needed, $N_{tx}$ with the number of transmission attempts targeted by the UE, $N_{tgt}$, to decide on the SIR target setting.

If the outer loop power control is situated in the RNC some information is signalled from the HARQ entity to the outer loop power control to inform the RNC about the power offset (or a similar quantity) the UE is using for a particular packet. This signalling occurs between the Node B and the RNC; so this information should be transmitted using the Iub frame protocol. The needed information should preferably be included in an existing user plane frame protocol frames as a new information field. Alternatively a new frame protocol control signalling between Node B and RNC could be used.

The information signalled in the frame protocol could, for example, contain an indication on what power offset is used or weather or not the UE has used a higher offset than the minimum or some other reference level. In another solution the signalling contains a relation between the actual number of transmission attempts needed, $N_{tx}$, and the number targeted by the UE, $N_{tgt}$. For example the ratio, $N_{tx}/N_{tgt}$, or the difference, $N_{tx}-N_{tgt}$ can be signalled.

The UE may select HARQ operating point based on which logical channel said data is received. Data with different priorities is often mapped on different logical channels, i.e. each logical channel represents different degree of priority. The skilled person realizes that the HARQ operating point may be chosen directly depending on the priority of the data was received.

The invention claimed is:

1. A method in a user equipment for obtaining efficient radio resource utilization and delivery of transmitted data in a communication network comprising a first communication network entity, a second communication network entity connected to said first communication network over a communication interface, and one or more user equipments transmitting data to said second communication network entity over a radio interface, said method comprising the steps of:
    autonomously selecting a first uplink channel and second uplink channel power offset based on a granted upper limit of a first uplink channel and second uplink channel power offset that may be used for transmitting data; and,
    sending information of the selected first uplink channel and second uplink channel power offset to the second communication network entity via an uplink channel, wherein the second communication network entity forwards the selected first uplink channel and second uplink channel power offset to the first communication network entity that determines based at least on the received selected first uplink channel and second uplink channel power offset whether a change in a number of transmission attempts compared to a configured value for a particular packet depends on variations in a quality of a channel or on temporary changes in power of the channel that was decided upon by the one user equipment.

2. The method according to claim 1, wherein said selected first uplink channel and second uplink channel power offset value is selected from a transport format table for each transport block size.

3. The method according to claim 2, wherein said transport format table is provided with at least two first uplink channel and second uplink channel power offset values per transport block size.

4. The method according to claim 1, further comprising the step of selecting said first uplink channel and second uplink channel power offset based on which logical channel data has been received.

5. The method according to claim 1, further comprising the step of selecting said first uplink channel and second uplink channel power offset based on power availability.

6. The method according to claim 1, wherein said second communication network entity can estimate which first uplink channel and second uplink channel power offset value said user equipment has selected.

7. The method according to claim 1, wherein said second communication network entity sends information of said selected first uplink channel and second uplink channel power offset to said first communication network entity.

8. The method according to claim 7, wherein said user equipment receives a targeted number of transmission attempts for delivery of data, wherein said information comprises a relation between the actual number of transmission attempts needed and the received targeted number of transmission attempts.

9. The method according to claim 1, wherein the first uplink channel and second uplink channel power offset is an Enhanced Dedicated Physical Control Channel (E-DPCCH)/Dedicated Physical Control Channel (DPPCH) power offset.

10. A user equipment for obtaining efficient radio resource utilization and delivery of transmitted data in a communication network comprising a first communication network entity, a second communication network entity connected to said first communication network over a communication interface, and one or more user equipments transmitting data to said second communication network entity over a radio interface, comprising:
    means for autonomously selecting a first uplink channel and second uplink channel power offset based on a granted upper limit of a first uplink channel and second uplink channel power offset that may be used for transmitting data; and,
    means for sending information of the selected first uplink channel and second uplink channel power offset to the second communication network entity via an uplink channel, wherein the second communication network entity forwards the selected first uplink channel and second uplink channel power offset to the first communication network entity that determines based at least on the received selected first uplink channel and second uplink channel power offset whether a change in a number of transmission attempts compared to a configured value for a particular packet depends on variations in a quality of a channel or on temporary changes in power of the channel that was decided upon by the one user equipment.

11. The user equipment according to claim 10, further comprising a transport format table comprising at least two first uplink channel and second uplink channel power offset values for each transport block size for selecting the first uplink channel and second uplink channel power offset.

12. The user equipment according to claim 10, wherein said user equipment comprises means for selecting said first uplink channel and second uplink channel power offset based on which logical channel data has been received.

13. The user equipment according to claim 10, wherein said user equipment comprises means for selecting said first uplink channel and second uplink channel power offset based on power availability.

14. The user equipment according to claim 11, wherein said second communication network entity is arranged to estimate which first uplink channel and second uplink channel power offset power offset value said user equipment has selected.

15. The user equipment according to claim 10, wherein said second communication network entity comprises means for sending information of said selected first uplink channel and second uplink channel power offset to said first communication network entity.

16. The user equipment according to claim 15, wherein said user equipment comprises means for receiving a targeted number of transmission attempts for delivery of data characterized in that said information comprises a relation between the actual number of transmission attempts needed and the received targeted number of transmission attempts.

17. The user equipment according to claim 10, wherein the first uplink channel and second uplink channel power offset is an Enhanced Dedicated Physical Control Channel (E-DPCCH) and Dedicated Physical Control Channel (DPPCH) power offset.

18. A method in a Radio Network Controller for obtaining efficient radio resource utilization and delivery of transmitted data in a communication network comprising the Radio Network Controller, a Node B connected to said Radio Network Controller over a communication interface, and one or more user equipments transmitting data to said Node B over a radio interface, said method comprising the steps of:
receiving via the Node B a first uplink channel and a second uplink channel power offset that was autonomously selected by one of the user equipments and sent to the Node B, where the one user equipment autonomously selected the first uplink channel and second uplink channel power offset based on a granted upper limit of a first uplink channel and second uplink channel power offset that may be used for transmitting data; and
determining based at least on the received selected first uplink channel and second uplink channel power offset whether a change in a number of transmission attempts compared to a configured value for a particular packet depends on variations in a quality of a channel or on temporary changes in power of the channel that was decided upon by the one user equipment.

19. A Radio Network Controller for obtaining efficient radio resource utilization and delivery of transmitted data in a communication network comprising the Radio Network Controller, a Node B connected to said Radio Network Controller over a communication interface, and one or more user equipments transmitting data to said Node B over a radio interface, said Radio Network Controller comprising:
means for receiving via the Node B a first uplink channel and second uplink channel power offset that was autonomously selected by one of the user equipments and sent to the Node B, where the one user equipment autonomously selected the first uplink channel and second uplink channel power offset based on a granted upper limit of a first uplink channel and second uplink channel power offset that may be used for transmitting data; and
means for determining based at least on the received selected first uplink channel and second uplink channel power offset whether a change in a number of transmission attempts compared to a configured value for a particular packet depends on variations in a quality of a channel or on temporary changes in power of the channel that was decided upon by the one user equipment.

20. A communication network comprising:
a first communication network entity;
a second communication network entity connected to the first communication network entity over a communication interface;
a user equipment configured to transmit data to the second communication network entity over a radio interface, wherein the user equipment configured to:
autonomously select a first uplink channel and second uplink channel power offset based on a granted upper limit of a first uplink channel and second uplink channel power offset that may be used for transmitting data; and,
send information of the selected first uplink channel and second uplink channel power offset to the second communication network entity via an uplink channel;
the second communication network entity configured to forward the selected first uplink channel and second uplink channel power offset to the first communication network entity;
the first communication network entity configured to:
receive via the second network entity the first uplink channel and a second uplink channel power offset that was autonomously selected by one of the user equipments and sent to the second communication network entity, where the one user equipment autonomously selected the first uplink channel and second uplink channel power offset based on a granted upper limit of a first uplink channel and second uplink channel power offset that may be used for transmitting data; and
determine based at least on the received selected first uplink channel and second uplink channel power offset whether a change in a number of transmission attempts compared to a configured value for a particular packet depends on variations in a quality of a channel or on temporary changes in power of the channel that was decided upon by the one user equipment.

* * * * *

UNITED STATES PATENT AND TRADEMARK OFFICE
CERTIFICATE OF CORRECTION

PATENT NO. : 8,208,456 B2
APPLICATION NO. : 11/575116
DATED : June 26, 2012
INVENTOR(S) : Helmersson et al.

Page 1 of 1

It is certified that error appears in the above-identified patent and that said Letters Patent is hereby corrected as shown below:

In Column 2, Line 42, delete "by the the" and insert -- by the --, therefor.

In Column 3, Line 8, delete "according:" and insert -- according --, therefor.

In Column 4, Line 66, delete "$T_{tgt}$," and insert -- $N_{tgt}$, --, therefor.

In Column 5, Line 18, delete "weather" and insert -- whether --, therefor.

In Column 6, Line 25, in Claim 9, delete "(DPPCH)" and insert -- (DPCCH) --, therefor.

In Column 7, Line 2, in Claim 14, delete "power offset power offset value" and insert -- power offset value --, therefor.

In Column 7, Lines 18-19, in Claim 17, delete "(DPPCH)" and insert -- (DPCCH) --, therefor.

Signed and Sealed this
Sixteenth Day of October, 2012

David J. Kappos
*Director of the United States Patent and Trademark Office*